(12) United States Patent
Hatchard et al.

(10) Patent No.: US 10,346,763 B2
(45) Date of Patent: Jul. 9, 2019

(54) DYNAMIC QUERY RESPONSE WITH METADATA

(71) Applicant: salesforce.com, inc., San Francisco, CA (US)

(72) Inventors: Derek Brian Hatchard, New Maryland (CA); Jordan Patrick Lutes, Fredericton (CA); Michael Gordon Luff, Killarney Road (CA)

(73) Assignee: SALESFORCE.COM, INC., San Francisco, CA (US)

( * ) Notice: Subject to any disclaimer, the term of this patent is extended or adjusted under 35 U.S.C. 154(b) by 1140 days.

(21) Appl. No.: 14/505,863

(22) Filed: Oct. 3, 2014

(65) Prior Publication Data

US 2015/0113007 A1    Apr. 23, 2015

Related U.S. Application Data

(60) Provisional application No. 61/893,582, filed on Oct. 21, 2013.

(51) Int. Cl.
*G06Q 10/00* (2012.01)
(52) U.S. Cl.
CPC ................................. *G06Q 10/00* (2013.01)

(58) Field of Classification Search
None
See application file for complete search history.

(56) References Cited

U.S. PATENT DOCUMENTS

| | | | |
|---|---|---|---|
| 8,775,423 B2* | 7/2014 | Pereyra-Rozas | G06Q 50/01 707/600 |
| 8,935,493 B1* | 1/2015 | Dolan | G06F 3/0649 711/117 |
| 2012/0047219 A1* | 2/2012 | Feng | G06F 17/3071 709/207 |
| 2014/0236916 A1* | 8/2014 | Barrington | G06F 17/30864 707/706 |
| 2015/0012593 A1* | 1/2015 | Phillips | H04L 67/2847 709/204 |

* cited by examiner

*Primary Examiner* — Tuankhanh D Phan
(74) *Attorney, Agent, or Firm* — Morris & Kamlay LLP

(57) ABSTRACT

Metadata and for posts originating from different social media sources and the posts themselves may be collected. A query specifying search criteria for the posts and filter criteria related to the metadata may be submitted to the system disclosed herein. The system may allow a client or tenant of the system to filter and search the metadata stored therein. The system may provide the posts in response to the query and permit a client or tenant to rapidly switch between social media sources and corresponding metadata types.

26 Claims, 7 Drawing Sheets

710 | USER1 PICTURE | USER1

You can discover more about a person in an hour of play than in a year of conversation.

July 4, 2014 at 12:01 PM

720 | USER2 PICTURE | USER2

We are what we repeatedly do. Excellence, then, is not an act, but a habit.

July 4, 2014 at 2:01 PM

702 {

730 | USER3: There is only one good, knowledge, and one evil, ignorance.

740 | USER4: Happiness is the highest good.

DYNAMIC QUERY RESPONSE WITH METADATA

CROSS REFERENCE TO RELATED APPLICATION

This application claims priority to provisional application No. 61/893,582 that was filed on Oct. 21, 2013 and is hereby incorporated by reference in its entirety.

TECHNICAL FIELD

Embodiments of the subject matter described herein relate generally to computer systems. More particularly, embodiments of the subject matter relate to web-based content analytics systems.

BACKGROUND

Computer based systems that analyze social media trends, user posts, and online content can be used to measure a variety of metrics. Social listening analytics techniques can be used to monitor and analyze social media activity. For example, a broad listening methodology may track various statistics, such as a current view count for content on a website, the number of replies to a user post, the number of reposts a message, or the like. The data accumulated from social media websites is voluminous and presents unique challenges to presenting it in a meaningful way to a client or user.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

As disclosed herein, post data and metadata associated with posts on social network sources may be stored in separate repositories. For example, one database may contain every post made by users in a social network, and a second database may contain the metadata associated with each of the posts. For example, the second database may have geographical information about the users that created the posts, the date and time of the posts, and/or other information about the author of the posts (e.g., demographic data). A user can then run searches within the posts, and filter the results of a search based upon the collected metadata. For example, a third party business may perform a key word search for a promotion the business has recently run. The business may query each of the social network posts in the first database using the key word. Posts containing the key word are returned based on the search, and can be filtered based on the metadata in the second database. For example, the business may view the posts returned in response to the query and select a metadata type (e.g., originating social network, post author location, date, time, etc.) by which to filter the returned posts. Because the posts and the metadata are maintained in separate repositories, the results may be rapidly filtered between social network sources and/or other metadata types associated with the returned posts. For example, all posts matching the initial search may be returned from the first database, and all associated metadata from the second database. A query system may present matching posts in a user interface that mirrors the data structure, i.e., allows the user to select metadata types and immediately see the resulting posts. The posts and/or the metadata also may be serialized or otherwise compressed, allowing for rapid transmission by the databases and rapid processing by the query system.

A system and method are provided that collect metadata for posts from social media sources (or media providers). Metadata may refer to data about a post rather than the content of the post itself. Examples of metadata includes, for example, a time reference, a language, an author, a geographic location, a URL, or any other information that describes the data (e.g., a post on a social media source). The posts and corresponding metadata may be filtered and searched within the system. A social media source may refer to a website on which a user may be linked or connected to other users in the form of a friend group or a "follower." A user of a social media source may post content that can be shared to individuals within a particular group (e.g., a friend group) or publicly shared. A database may be populated with metadata and/or data for posts based on content obtained by a web crawler. The web crawlers may identify posts to be retrieved from the social media sources or other online sources by searching for a keyword match.

One or more of a user's posts, the metadata corresponding to the user's posts, posts responsive to the user's posts, metadata corresponding to the responsive posts, and/or a user's profile on the social media source, may not be readily available to the public or accessible by a web crawler. The social media source, however, may provide or otherwise make available the publicly unavailable data and/or metadata to collaborating partners. The posts and the metadata for each post may be stored in separate repositories. The data representing posts may be retrieved faster and separately in such a configuration than if the posts and the metadata were combined in a single large repository. Upon receipt of a query for posts, specific metadata specified in the query may be obtained from the repository containing the metadata. The metadata and the posts may be provided as a response to the query for display to one or more clients. Data and metadata may be ingested by the system from a variety of sources in different ways. The system, such as the example shown in FIG. 1, may be a multi-tenant system as will be described later.

Figure 1:
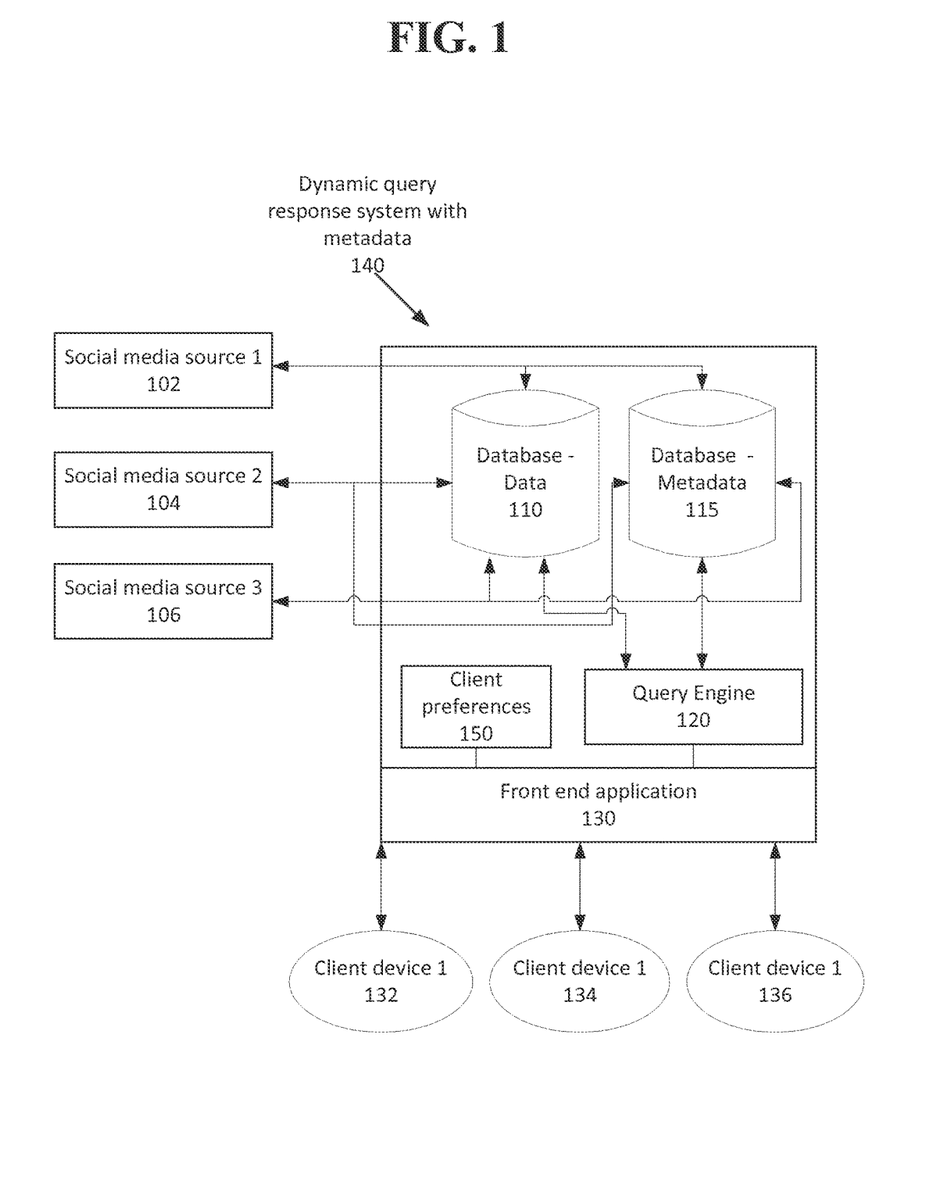
FIG. 1 is an example configuration of the dynamics query response with metadata system according to an implementation disclosed herein.

FIG. 1 shows an overview of the dynamic query response with metadata system 130. Social media sources 102, 104, 106 may be ingested into one or more databases 110, 115. In some configurations, the data corresponding to the content of posts on the social media sources and the metadata may be stored on a single database. Due to the large volume of data and metadata ingested by the system 140, the metadata may be stored as a structured document such as a JSON document in a serialized form. Each piece of metadata may be associated with a media type (e.g., a type of metadata such as geolocation). A single post, for example, may have multiple pieces of metadata (e.g., a geolocation and a time reference) and each piece may be assigned a media type. Posts obtained from the social media sources may be assigned a post identification number during the ingestion process. The identification number for each post may be associated with its corresponding metadata. In FIG. 1, the system 140 is shown with the databases 110, 115 being a component thereof with the query engine. However, in some cases, as described above, a third party provider (e.g., the social media source or other intermediary) may provide data and metadata that are not publicly available to the system 140. One or both of the databases 110, 115 shown in FIG. 1, may be external to the system 140 in some configurations. The system 140 may include circuitry and hardware sufficient for its operation (e.g., a processor, a system bus, communications hardware). Client devices 132, 134, 136 may connect to the system to make requests for a subset of the data and/or metadata via a front end application 130. The front end application may provide the interface for the client devices 132, 134, 136. The system may be configured as a multi-tenant system that may enable multiple client devices 132, 134, 136 to simultaneously utilize it independent of other clients. The system 140 may obtain information about each client corresponding to each client device 132, 134, 136 and tailor its responses to queries by the client devices 132, 134, 136 based on information about the client stored as client preferences 150. The client preferences 150 may be provided to the front end application 130 for processing and/or providing the correct interface. For example, a client may have access to only a subset of the available data in the system or have a specific user interface (e.g., color scheme, selectable options, layout of the interface).

Figure 2:
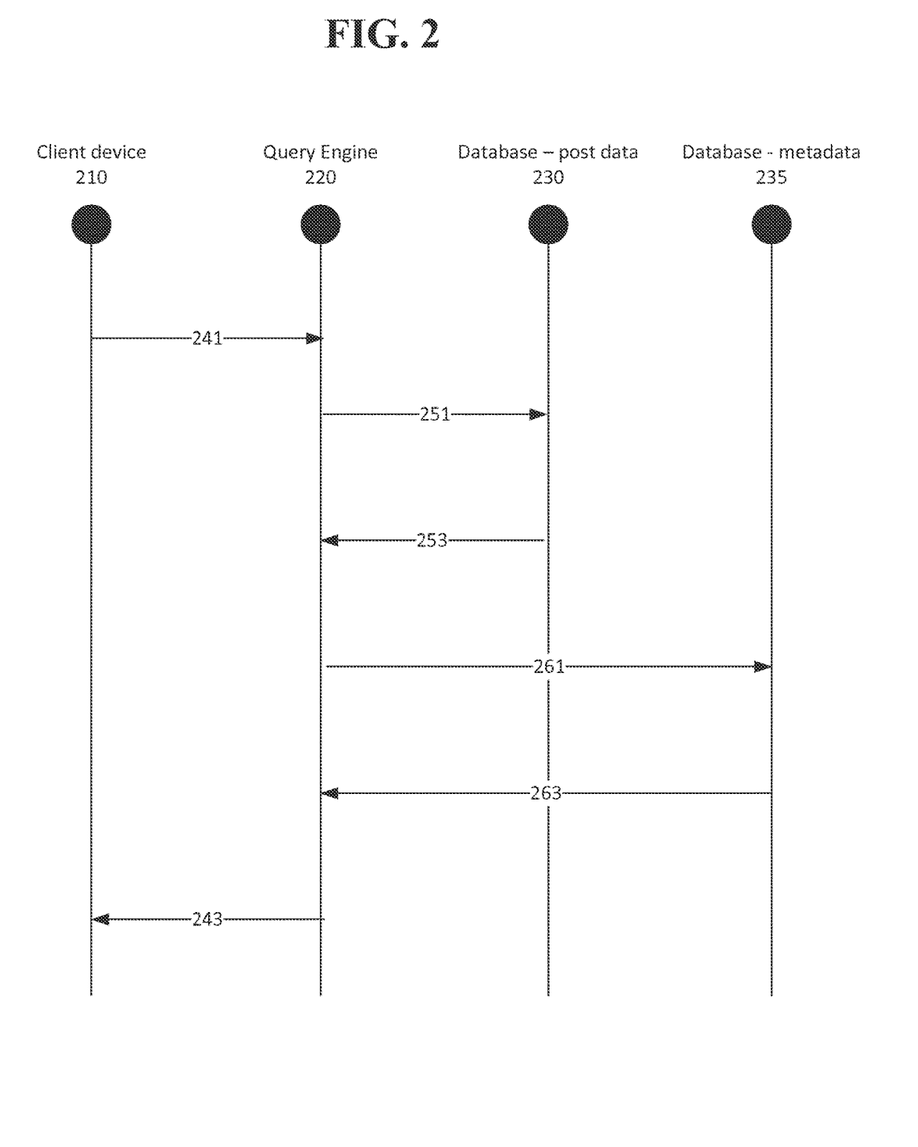
FIG. 2 shows an example of how a client query may be processed by the query engine and the databases containing the post data and the metadata as disclosed herein.

FIG. 2 shows an example of how a client query may be processed by the query engine 220 and the databases containing the post data and the metadata, respectively 230, 235 as components of the dynamic query response with metadata system. The databases 230, 235 may be physically separate or a single entity. A client computing device 210 may submit a query to the system 241 in which the client is requesting data (e.g., posts from social media sources) matching one or more keywords and that is filtered according to one or more metadata criteria. The client device 210 may request that the response to the query is filtered according to a media type assigned to the metadata. For example, the client device 210 may select or specify a social media source from several media sources and request all of the posts matching a key word provided with the query that have a geographical location (e.g., a media type) of Canada or the US from the query engine 220. The query engine 220 may receive and process several requests simultaneously and independent of one another 241. The query engine 220 may request from the posts database 230 those social media source posts that match keywords provided in the query at 251. The database 230 may receive the request from the query engine 220 and retrieve and return, at 253, the appropriate identification numbers corresponding to posts matching the specified key words to the query engine 420. The query engine 220, at 261 and 263 respectively, may request and receive from the database 235 the metadata corresponding to the posts identified as matching the key word(s) in the query 241 from the client device 210. The query engine 220 may collect the post identification numbers, the media provider (e.g., the social media source), the media type (e.g., the specified metadata). In configurations in which the metadata has been serialized or otherwise compressed, the query engine may deserialize or decompress the metadata and determine the metadata that matches that specified in the query 241. The query engine 220 may generate a response to the request and provide it, at 243, to the client device 210. The response may be provided to a front end application that may organize the response generated by the query engine 220 in a format desired by the client device 210. For example, the query engine 220 may provide all of the posts from a first social media source and a second social media source that have a geolocation of Australia to the user.

In some configurations, the client device request at 241 may include only a key word and specify a provider or social media source. After the query engine 220 has received the posts at 253, based on the post identification numbers, that match the key word provided by the request at 241, the client may submit a second request to the query engine 220 that specifies a particular type of metadata (e.g., a particular location). The query engine would submit the request at 461 subsequent to the second request from the client device 410. Subsequent to 263, the query engine 220 may generate a response that is sent to the front end application that changes the view for the client device 210 based on the response generated by the query engine 220. The response may be provided to the client device 220 at 243.

For example, if a user requested all of the social media posts from source ABC that match (e.g., include) the word "baseball," the system may return a list of 500 million posts or an abbreviated representation thereof (e.g., a shortened list, an indication of the number of hits returned, a random or non-random selection of matching posts, etc.) if the number, as in this case, is too large to reasonably be displayed to a client device 210. If the client device 210 specifies that the posts must have occurred within the last week and be from Japan, the system may retrieve only those posts whose identification numbers were obtained from the first query (i.e., "baseball") and further refine the returned list to those posts containing "baseball" and whose media type (e.g., geolocation and time) corresponds to Japan and that were made in the last week. The system may represent the data in a variety of ways including altering the user interface or presenting the returned results in an analytical form such as a graphical representation (e.g., a pie chart). If the client device 210 submits a new metadata filter request, such as requesting the posts from the first query (i.e., "baseball") that were from the U.S. and made within the last 7 days, the system may again submit the third request to the query engine 220, which will obtain the appropriate posts that correspond to the specified metadata filter. The client device 110 may, therefore toggle between the different metadata filters that the user would like to apply.

The system user interface may offer the client device the ability to filter the retrieved posts that match the key word based on the social media source and/or preset metadata filters. As in the example above, a query for the word "baseball" may be offer the client device the ability to filter based on several, possibly overlapping, geographic boundaries, time, attachments (e.g., pictures, audio, video, etc.) to the posts, demographic information, social media source, etc. The system may offer premium content for some clients that may present those clients with more available filters than a non-premium client. In some instances, a first social media source and a second social media source may not have the same metadata available. In the event the client device selects or enters a metadata filter that is not available in a social media source, the posts for that social media source may not be displayed.

The system may have predefined media types for the metadata such as geolocation. However, during the data/metadata ingestion process, the system will collect any data/metadata available. The system does not need to explicitly define the collected metadata as a media type. As such, the system may accommodate new forms of metadata that may become available for existing social media sources or new social media sources.

Figure 3:
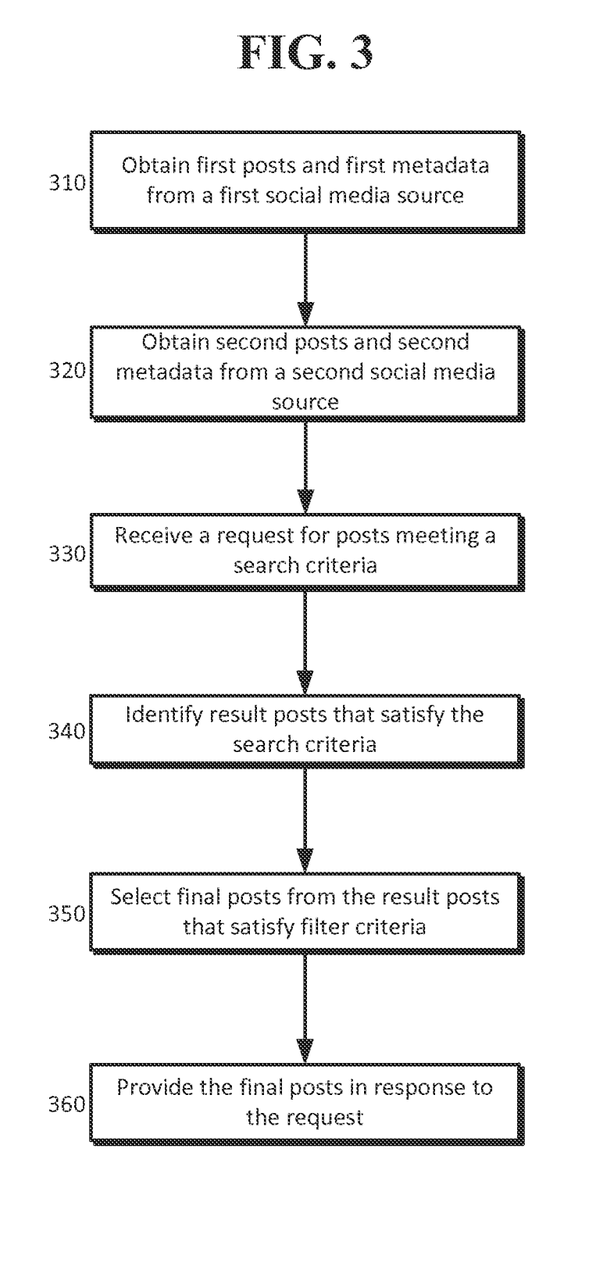
FIG. 3 shows an example process flow for providing a response to a query specifying one or more social media sources and one or more filter criteria as disclosed herein.
Figure 7:
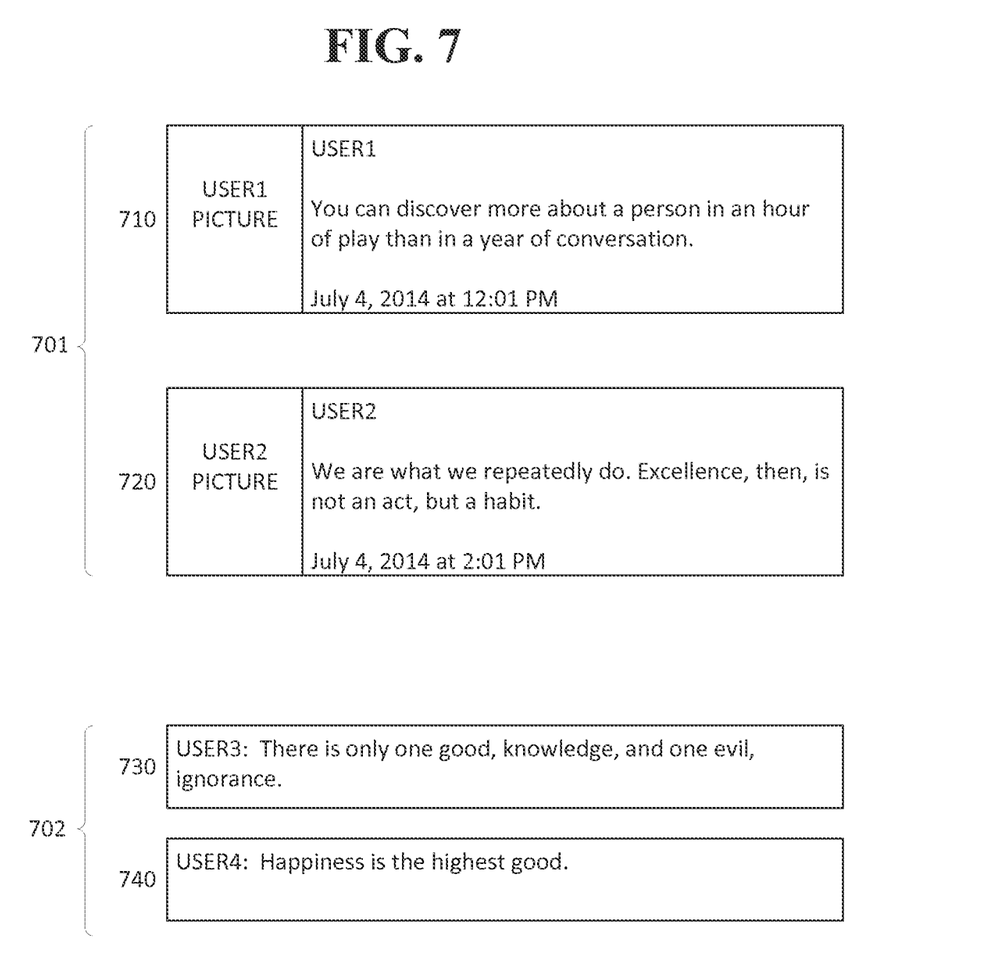
FIG. 7 shows an example of posts obtained from two different social media sources.
Figure 8:
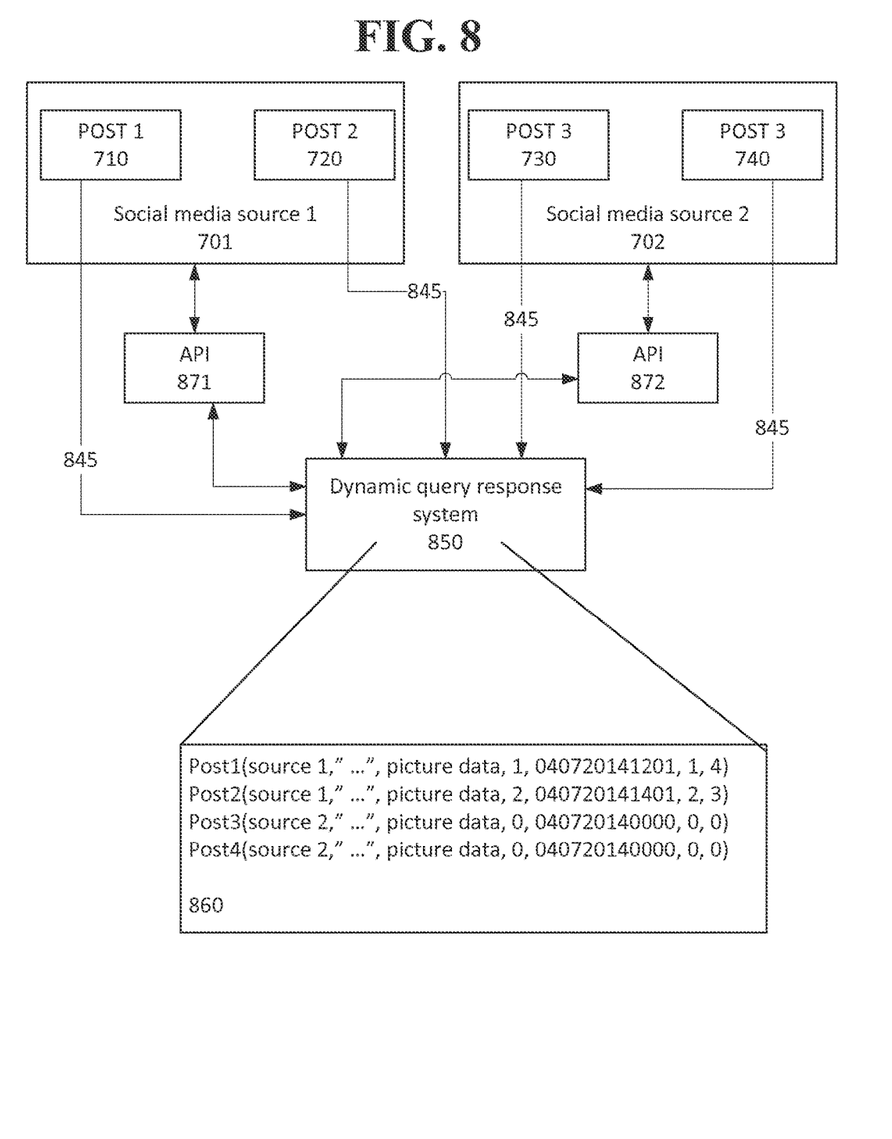
FIG. 8 is an example of how the data and metadata from the posts in FIG. 7 may be stored in a database.

According to an implementation, an example of which is provided in FIG. 3, first posts and first metadata may be obtained from a first social media source at 310. Similarly, second posts and second metadata may be obtained from a second social media source at 320. The first social media source and the second social media source may be distinct from one another and have distinct formats for their posts and content that is available in the posts and/or metadata. A post may refer to the content visible to a user of a social media website, for example. FIG. 7 shows an example of four posts 710, 720, 730, 740 two of which are from one social media source 701, and two of which are from a second social media source 702. The posts from the first source may include a picture of each user and a date and time stamp displayed on the post. Posts three and four may have a character limit and include only a user handle (e.g., "USER3," and "USER4"). FIG. 8 shows an example of how each of the posts may be ingested into the system 850. A web crawler may retrieve the contents of each of the posts that are publicly available at 845. Each social media source 701, 702 may separately provide the post data (e.g., the text and other publicly exposed data and data associated with the post or the metadata via an API 871, 872.

As an example, the data may be organized by the system, and stored in one or more databases, in the following format: Post identifier (source, text, picture data, location data, time reference, user data 1, user data 2). The post identifier may be utilized to associate the data of the post with the metadata. In the event the databases that store the content are sharded, the post identifier may be utilized to recombine the data in a desired format. Although the example in FIG. 8 shows the data and metadata combined into a single format, they may be separately received and maintained in separate repositories as described earlier. In FIG. 8, each of the posts may be identified by a post identifier (post1, post2, post3, post4). Each source may be indicated by an integer that corresponds to a particular source. For example, social media source 1 may be indicated in the database as a 1 and a 2 may indicate social media source 2. The text of each post is indicated by " . . . " A binary representation of a picture may be stored or other machine readable code capable of recreating the image may be stored as an entry (indicated as "picture data" in FIG. 8) 860. The entries 860 may be stored in a serialized or unserialized form. Location data may be indicated by a region code. For example, a post originating from the United States may be indicated by a 1 whereas a post from Germany may be indicated by a 2. In the event that location data are not available, the system may utilize a placeholder value such as 0 to indicate that no data are available for that particular data or metadata component. More specific data may be utilized in place of or in addition to the region code such as GPS coordinates of the post. An indication of the time at which the post was made may be included such as "040720141201" for post1. User data such as gender and age of the poster may be indicated by an integer; in the case of age, the integer may correspond to a range of ages such as 20-29 year olds. In the example in FIG. 8, the first social media source may have provided gender and age information. However, such information may not be available from the second social media source. Thus, posts 3 and 4 may indicate that they lack this information by storing 0 values for the last two stored entries as shown.

Returning to FIG. 3, a request for a posts meeting a search criteria for at least one of the first social media source and the second social media source may be received at 330. The request may include filter criteria specifying a subset of metadata from at least one of the first social media source and the second social media source. In some configurations, the system may first obtain posts from the first social media source and/or the second social media source that match the key word(s) provided by the request. The result posts may correspond to posts that are identified as satisfying the search criteria (e.g., matching the key word(s)) at 340. Final posts may be selected from the result posts that satisfy the filter criteria (e.g., specified media type or metadata) at 350 as described earlier. The metadata may be stored in a database in a serialized or compressed form. Prior to applying the filter criteria to the result posts, the metadata may be deserialized or decompressed so that the appropriate data can be fetched therefrom. The final posts may be provided in response to the request at 360. The organization and/or representation of these posts may be literal (e.g., exactly what each post showed in its original context), graphical, analytical (e.g., a statistical analysis of the selected posts), etc. as described earlier.

A system is disclosed that includes a database for storing at least one of first posts, second posts, first metadata and second metadata. The database may be communicatively coupled to a processor. As described earlier, the system may include multiple databases, each of which stores post data or metadata. For example, the query engine shown in FIG. 1 may be connected to a processor and two or more databases. The processor may be configured to obtain first posts and first metadata from a first social media source and obtain second posts and second metadata from a second social media source. The processor may receive a request for posts meeting a search criteria for the first social media source, the second social media source, and/or a filter criteria specifying a subset of metadata from either of those sources as described above. The processor may identify result posts that satisfy the search criteria and select final posts from the result posts that satisfy the filter criteria. A representation of the final posts may be provided in response to the request.

Figure 4:
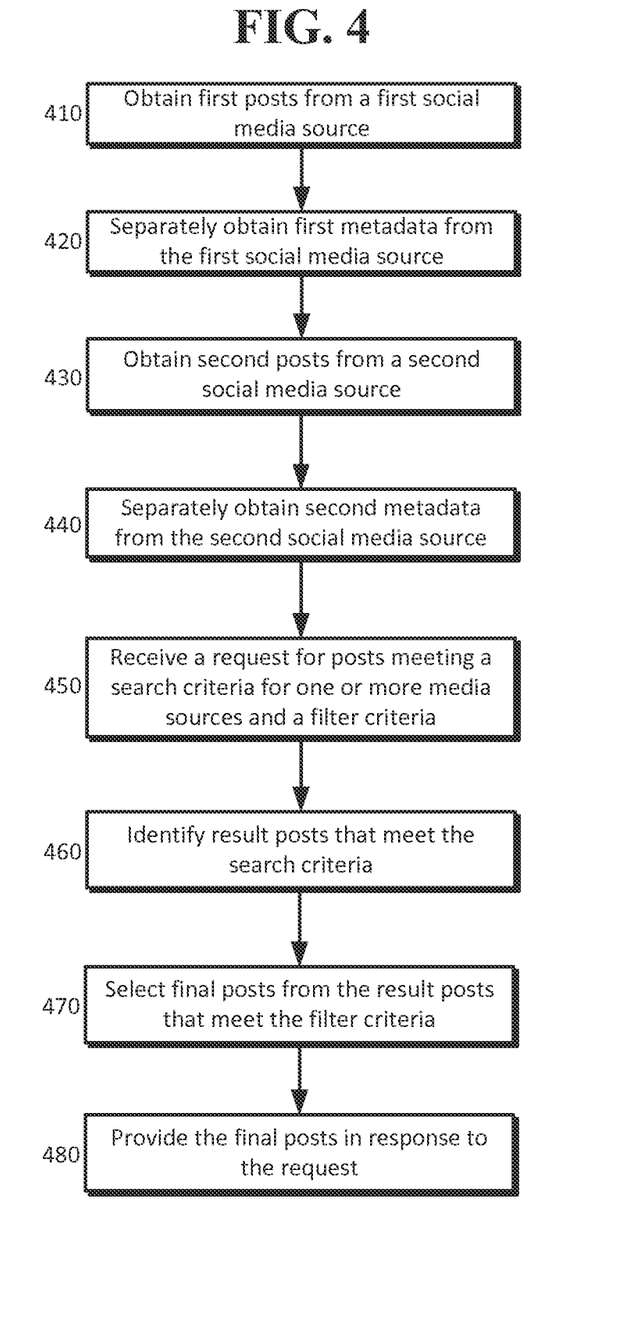
FIG. 4 is an example of a process in which the metadata from a social media source may be separately obtained from the post data as disclosed herein.

In an implementation, an example of which is provided in FIG. 4, a process is disclosed in which the metadata from a social media source may be separately obtained from the post data. Posts may be obtained from a social media source (e.g., a social network website) at 410. Separately, metadata associated with the posts may be obtained from the social media source at 420. The metadata may not be available in the posts themselves. For example, a single post on the first social media source may include data representing the post itself as it is visible to a user of the social network source. As a specific example, a social media source may time stamp every post made on its network. Thus, each post will include the time as metadata and the content of the post. However, the post may not indicate the age of the author of the post. However, if the social network indicates the author of each post, and separately provides a profile of the author that indicates the author's age, the age of the author of a specific post may be associated with the post as metadata. The social media source may store in its database an indication that the metadata and data corresponding to the single post are associated with one another. When the social media source provides the metadata it may, therefore, provide an indication of which posts are associated with which metadata. In a similar manner, additional posts may be obtained from a second social media source at 430 and the metadata corresponding to the additional posts may be separately obtained at 440. The additional posts may be of a different post type than the posts from the first social media source. For example, the format of a post on the first source may include pictures, videos, and/or audio content. The second social media source, however, may have a 150 character text limit and disallow other forms of media files (e.g., audio, video, and image).

As another example, a first social media source may be a blog post and the second social media post may be a tweet. The metadata available from the first source may differ from the metadata available from the second source as well. Thus, in implementations disclosed herein, the data and metadata ingested from a variety of social media sources may differ in format and content. The system may extract features from the data and metadata before storing it in a database in order to unify the organization and/or structure of the data and metadata in some configurations. For example, a social media source may provide a specification for how post data and metadata associated therewith will be provided such as via a published API. Each social media source's published specification can be mapped to a unified database structure.

A request for posts meeting search criteria for one or more of the social media sources may be received at 450. The request may specify filter criteria at this time or subsequent to retrieval of the posts meeting the search criteria as described earlier. Result posts that meet the search criteria may be identified at 460 and final posts may be selected from those result posts that meet the filter criteria at 470. The final posts may be provided in response to the request as described earlier.

In some instances, metadata may be provided or obtained from a third party analytics provider. Analytics may refer to the measurement, collection, analysis, and reporting of data regarding, for example, a web site's usage or a popularity of a product online. For example, the analytics for a social media source may include data about the visibility or comments related to a particular product or promotion. It may include user behavior upon presentation of a product or promotion. These data may be included in the implementations disclosed above.

The system disclosed herein may be implemented as a multi-tenant system. The system may include a server that can generate one or more virtual applications based on data stored in a common database shared between the tenants. Each virtual application may provide access to data in the database for each of the one or more tenants utilizing the system. A tenant may refer to a group of users that shares access to common data within a database. A tenant may represent customers, customer departments, business or legal organizations, and/or any other entities that maintain data for particular sets of users. A tenant may, for example, request social media posts, metadata, and/or analytics provider data. Although multiple tenants may share access to a common server and database, the particular data and services provided from the system to each tenant can be securely isolated from those provided to other tenants. The multi-tenant architecture therefore allows different sets of users to share functionality without necessarily sharing each other's data. Similarly, the appearance of each tenant's interface with the system may be unique.

In some configurations, the system may receive an indication that a user has entered a particular location such as a department store. The user may be determined to be in proximity of the department store by GPS data associated with a user's smartphone or other indicators of the user's presence in the store. For example, the user may check-in at the store via a social network. The check-in may be broadcast to the user's friends via the social network. The system may associate purchases by a user at a particular department store or the like (e.g., restaurants) with the metadata stored in the database. Further the system may analyze the user's purchase habits to determine trends in the types of items a user's purchases, the stores a user frequents, and the amount of money expended per visit or per store, for example. The purchase habits, purchase history, check-in posts, etc. may be stored as metadata that can be associated with the user.

Figure 5:
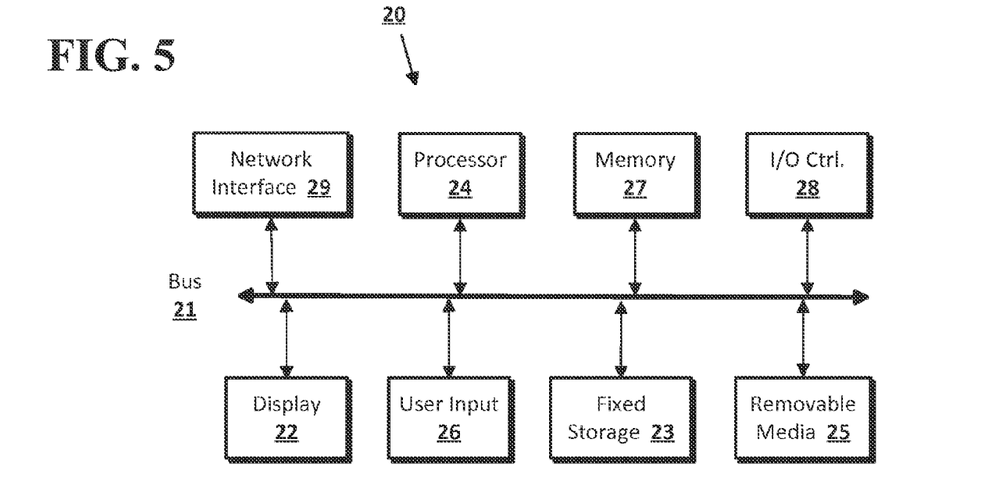
FIG. 5 shows a computer according to an implementation of the disclosed subject matter.

Implementations of the presently disclosed subject matter may be implemented in and used with a variety of component and network architectures. FIG. 5 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
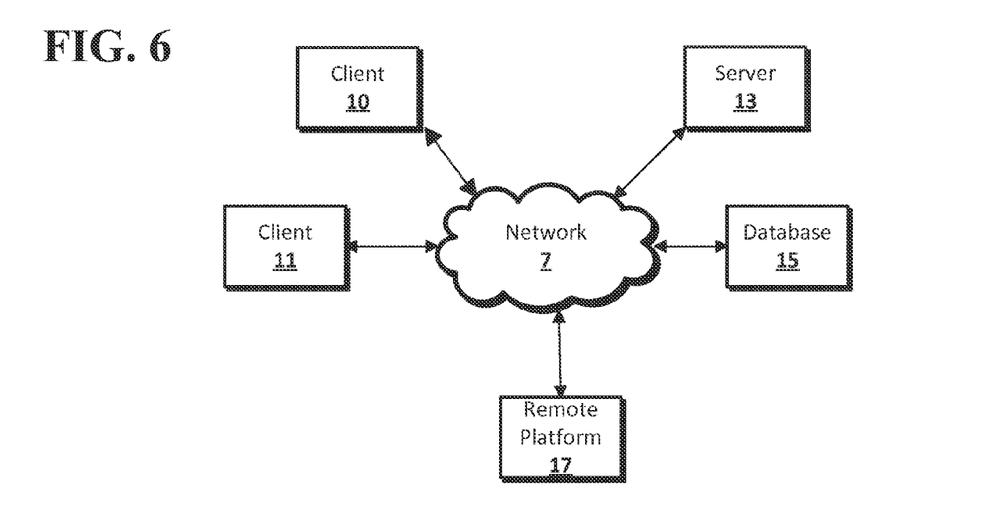
FIG. 6 shows a network configuration according to an implementation of disclosed subject matter.

FIG. 6 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system, comprising:
   a first database configured to store at least first posts and second posts;
   a second database configured to store at least first metadata and second metadata; and
   a processor communicatively coupled to the first database and the second database, the processor configured to:
   obtain, for the first database, the first posts from a first social media source;
   obtain, for the second database, the first metadata from the first social media source;
   obtain, for the first database, the second posts from a second social media source, wherein the second posts are of a different post type than the first posts;
   obtain, for the second database, the second metadata from the second social media source;
   assign, for the first posts and the second posts, identification numbers;
   associate the identification numbers with the first metadata and the second metadata;
   receive a request for posts that meet search criteria for media sources and filter criteria that specify a subset of at least one of the first metadata or the second metadata;
   retrieve, from the first database, the identification numbers of posts that meet the search criteria, the identification numbers having been assigned to the posts;
   receive, from the second database, metadata for posts that are associated with the identification numbers and that meet the filter criteria, the metadata having corresponding identification numbers, the identification numbers having been assigned to the posts; and
   provide, in response to the request, the posts that meet the search criteria and the filter criteria.

2. The system of claim 1, wherein the second database is separate from the first database.

3. The system of claim 1, the processor further configured to:
   send, to the first database, a request for the posts that meet the search criteria; and
   send, to the second database, a request for the metadata for the posts that are associated with the identification numbers and that meet the filter criteria.

4. The system of claim 1, the processor further configured to:
   serialize the first metadata and the second metadata; and
   store the first metadata and the second metadata.

5. The system of claim 1, wherein at least one of the processor is configured to obtain the first metadata from a third party analytics provider or the processor is configured to obtain the second metadata from the third party analytics provider.

6. The system of claim 1, wherein the at least one of the first metadata or the second metadata is serialized.

7. The system of claim 1, the processor further configured to deserialize the at least one of the first metadata or the second metadata prior to a receipt of the metadata.

8. The system of claim 1, the processor further configured to associate the first metadata with the first posts and the second metadata with the second posts.

9. The system of claim 7, wherein the processor is configured to deserialize responsive to the request for the metadata.

10. The system of claim 1, wherein the processor is obtain the first posts from a webcrawler, to obtain the first metadata from the webcrawler, to obtain the second posts from the webcrawler, and to obtain the second metadata from the webcrawler.

11. The system of claim 1, wherein the processor is obtain the first posts from a first application programming interface associated with the first social media source, to obtain the first metadata from the first application programming interface, to obtain the second posts from a second application programming interface associated with the second social media source, and to obtain the second metadata from the second application programming interface.

12. A computer-implemented method, comprising:
obtaining, for a first database, first posts from a first social media source;
obtaining, for a second database, first metadata from the first social media source;
obtaining, for the first database, second posts from a second social media source, wherein the second posts are of a different post type than the first posts;
obtaining, for the second database, second metadata from the second social media source;
assigning, for the first posts and the second posts, identification numbers;
associating the identification numbers with the first metadata and the second metadata;
receiving a request for posts that meet search criteria for one or more media sources and filter criteria that specify a subset of at least one of the first metadata or the second metadata;
retrieving, from the first database, the identification numbers of posts that meet the search criteria, the identification numbers having been assigned to the posts;
receiving, from the second database, metadata for posts that are associated with the identification numbers and that meet the filter criteria, the metadata having corresponding identification numbers, the identification numbers having been assigned to the posts; and
providing, in response to the request, the posts that meet the search criteria and the filter criteria.

13. The method of claim 12, wherein at least one of the obtaining the first metadata or the obtaining the second metadata is from a third party analytics provider.

14. The method of claim 12, wherein the at least one of the first metadata or the second metadata is serialized.

15. The method of claim 12, further comprising deserializing the at least one of the first metadata or the second metadata prior to the receiving the metadata.

16. The method of claim 12, further comprising associating the first metadata with the first posts and the second metadata with the second posts.

17. The method of claim 12, wherein the one or more media sources include at least one of the first social media source or the second social media source.

18. The method of claim 12, wherein the second database is separate from the first database.

19. The method of claim 12, further comprising:
sending, to the first database, a request for the posts that meet the search criteria; and
sending, to the second database, a request for the metadata for the posts that are associated with the identification numbers and that meet the filter criteria.

20. The method of claim 12, further comprising:
serializing the first metadata and the second metadata; and
storing the first metadata and the second metadata.

21. The method of claim 15, wherein the deserializing is performed responsive to the request for the metadata.

22. The method of claim 12, wherein the obtaining the first posts comprises obtaining the first posts from a webcrawler, the obtaining the first metadata comprises obtaining the first metadata from the webcrawler, the obtaining the second posts comprises obtaining the second posts from the webcrawler, and the obtaining the second metadata comprises obtaining the second metadata from the webcrawler.

23. The method of claim 12, wherein the obtaining the first posts comprises obtaining the first posts from a first application programming interface associated with the first social media source, the obtaining the first metadata comprises obtaining the first metadata from the first application programming interface, the obtaining the second posts comprises obtaining the second posts from a second application programming interface associated with the second social media source, and the obtaining the second metadata comprises obtaining the second metadata from the second application programming interface.

24. A non-transitory computer-readable medium storing computer code including instructions for controlling a processor to cause the processor to:
obtain, for a first database, first posts from a first social media source;
obtain, for a second database, first metadata from the first social media source;
obtain, for the first database, second posts from a second social media source, wherein the second posts are of a different post type than the first posts;
obtain, for the second database, second metadata from the second social media source;
assign, for the first posts and the second posts, identification numbers;
associate the identification numbers with the first metadata and the second metadata;
receive a request for posts that meet search criteria for one or more media sources and filter criteria that specify a subset of at least one of the first metadata or the second metadata;
retrieve, from the first database, the identification numbers of posts that meet the search criteria, the identification numbers having been assigned to the posts;
receive, from the second database, metadata for posts that are associated with the identification numbers and that meet the filter criteria, the metadata having corresponding identification numbers, the identification numbers having been assigned to the posts; and
provide, in response to the request, the posts that meet the search criteria and the filter criteria.

25. The non-transitory computer-readable medium of claim 24, wherein the instructions for controlling the processor to the cause the processor to obtain the first posts comprises instructions for controlling the processor to the cause the processor to obtain the first posts from a webcrawler, the instructions for controlling the processor to the cause the processor to obtain the first metatdata comprises instructions for controlling the processor to the cause the processor to obtain the first metadata from the webcrawler, the instructions for controlling the processor to the cause the processor to obtain the second posts comprises instructions for controlling the processor to the cause the processor to obtain the second posts from the webcrawler, and the instructions for controlling the processor to the cause the processor to obtain the second metadata comprises instructions for controlling the processor to the cause the processor to obtain the second metadata from the webcrawler.

26. The non-transitory computer-readable medium of claim 24, wherein the instructions for controlling the processor to the cause the processor to obtain the first posts comprises instructions for controlling the processor to the cause the processor to obtain the first posts from a first application programming interface associated with the first social media source, the instructions for controlling the processor to the cause the processor to obtain the first metatdata comprises instructions for controlling the processor to the cause the processor to obtain the first metadata from the first application programming interface, the instructions for controlling the processor to the cause the processor to obtain the second posts comprises instructions for controlling the processor to the cause the processor to obtain the second posts from a second application programming interface associated with the second social media source, and the instructions for controlling the processor to the cause the processor to obtain the second metadata comprises instructions for controlling the processor to the cause the processor to obtain the second metadata from the second application programming interface.

\* \* \* \* \*